United States Patent [19]
Miyazaki et al.

[11] Patent Number: 5,995,382
[45] Date of Patent: Nov. 30, 1999

[54] SELF-OSCILLATION TYPE SWITCHING POWER SUPPLY

[75] Inventors: Kengo Miyazaki; Yasunori Ijiri, both of Kyoto, Japan

[73] Assignee: Murata Manufacturing Co., Ltd., Japan

[21] Appl. No.: 09/172,580

[22] Filed: Oct. 13, 1998

[30] Foreign Application Priority Data

Oct. 17, 1997 [JP] Japan ................................. 9-285808

[51] Int. Cl.$^6$ .......................... H02M 3/335; H02M 3/24; H02M 7/537
[52] U.S. Cl. ............................. 363/19; 363/97; 363/131; 323/902
[58] Field of Search ................. 363/18, 19, 97, 363/131; 323/902

[56] References Cited

U.S. PATENT DOCUMENTS

| | | | |
|---|---|---|---|
| 4,283,759 | 8/1981 | Koiki | 363/19 |
| 4,763,235 | 8/1988 | Morita | 363/19 |
| 4,763,236 | 8/1988 | Usui | 363/19 |
| 5,412,555 | 5/1995 | Uramoto | 363/18 |
| 5,675,479 | 10/1997 | Tani et al. | 363/19 |

FOREIGN PATENT DOCUMENTS

| | | | |
|---|---|---|---|
| 60-170465 | 9/1985 | Japan | H02M 3/338 |
| 63-87170 | 4/1988 | Japan | H02M 3/335 |

*Primary Examiner*—Peter S. Wong
*Assistant Examiner*—Bao Q. Vu
*Attorney, Agent, or Firm*—Ostrolenk, Faber, Gerb & Soffen, LLP

[57] ABSTRACT

A self-oscillation type switching power supply includes a transformer having a primary winding, a secondary winding, a feedback winding, and a control winding as required, a switching transistor to turn on and off a current flowing in the primary winding, a controlling transistor to control a positive feedback signal from the feedback winding or the control winding to said switching transistor, and a time constant circuit to charge a generated voltage across the feedback winding or the control winding with a fixed time constant and to give a controlling voltage to said controlling transistor. A delay transistor to delay the turn-on of said switching transistor is contained in a controlling signal input portion to said switching transistor, and a delay circuit is provided to delay a positive feedback signal from the control winding or the feedback winding with a fixed time constant and to give the delayed signal as a controlling signal to said delay transistor.

26 Claims, 9 Drawing Sheets

SELF-OSCILLATION TYPE SWITCHING POWER SUPPLY

BACKGROUND OF THE INVENTION

1. Field of the Invention

The present invention relates to a self-oscillation type switching power supply, and more specifically, to a switching power supply having a high output voltage.

2. Description of the Related Art

Figure 12:
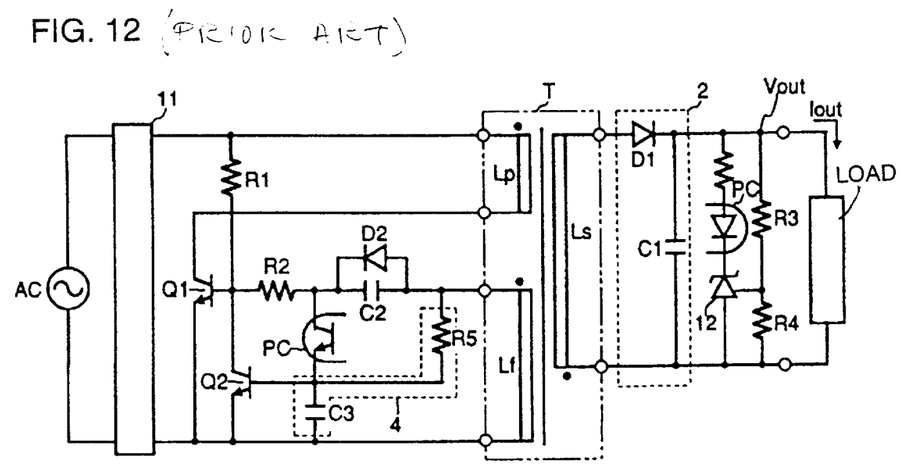
FIG. 12 is a circuit diagram of a conventional self-oscillation type switching power supply.

A ringing choke converter has been often utilized as a self-oscillation type power supply. FIG. 12 is a circuit diagram of an existing ringing choke converter. In the drawing, numeral 11 represents a DC power-supply circuit for generating about 120 V DC voltage by rectifying and smoothing a commercial AC power supply and T represents a transformer having a primary winding $L_p$, a secondary winding $L_s$, and a feedback winding $L_f$. Q1 is a switching transistor connected to the DC power-supply through the primary winding $L_p$ of the transformer. To the base of the switching transistor Q1 a starting resistor R1 is connected. Between the feedback winding $L_f$ and the base of the switching transistor Q1 a current-limiting resistor R2, a speed-up capacitor C2, and a diode D2 are connected. Further, between the base and emitter of the switching transistor Q1 a controlling transistor Q2 is connected and across the feedback winding $L_f$ a time constant circuit 4 comprising a resistor R5 and a capacitor C3 is arranged, and they are connected so that the voltage across the capacitor C3 is applied to the base of the controlling transistor Q2. To the secondary winding Ls a rectifying and smoothing circuit 2 comprising a rectifier diode D1 and a smoothing capacitor C1 is connected. To the output side of the rectifying and smoothing circuit 2 a voltage-dividing resistor circuit comprising a resistor R3 and resistor R4, a variable shunt regulator 12, and a photo coupler are connected. The photo-transistor in this photo coupler PC is connected in the charging path for the capacitor C3.

The operation of the power supply shown in FIG. 12 is as in the following. When a DC voltage is applied from the DC power-supply circuit 11, a very small amount of starting current flows into the base of the switching transistor Q1 through the starting resistor R1. As a result, a current flows through the collector of the transistor Q1 and the voltage between the collector and emitter reduces. Then, a voltage is applied across the terminals of the primary winding $L_p$ of the transformer T and an induced voltage proportional to the applied voltage is generated across the feedback winding $L_f$. Because of this induced voltage, a positive feedback current is supplied to the base of the switching transistor Q1 through the current-limiting resistor R2, and the speed-up capacitor C2 and the diode D2 in parallel, and the transistor Q1 is switched to the ON state (saturation). When the transistor Q1 is turned on, a DC voltage is applied between the terminals of the primary winding $L_p$ of the transformer T and a current flows through the primary winding $L_p$ to cause excitation of the transformer T. At this time, the induced voltage generated across the feedback winding $L_f$ at the same time charges the capacitor C3 through the resistor R5, speed-up capacitor C2, diode D2, and photo-transistor of the photo coupler PC. When the charged voltage of this capacitor C3 reaches the threshold voltage (about 0.6 V) between the base and emitter of the controlling transistor Q2, the base and emitter of the switching transistor Q1 is short circuited. This cuts off the base current of the switching transistor Q1 to turn off the transistor Q1 rapidly. Here, the duration in which the switching transistor Q1 is turned on is equal to the time from start of charging the capacitor C3 to attainment of the voltage across the capacitor C3 to about 0.6 V. When the switching transistor Q1 is turned off, the base of the switching transistor Q1 is reverse biased to a negative potential by the induced voltage across the feedback winding $L_f$. At the same time the electric charge of the capacitor C3 is forced to discharge (reverse charge) by the feedback winding $L_f$ through the resistor R5, and so the base of the controlling transistor Q2 is reverse biased to a negative potential. Therefore, until the excitation energy of the transformer T is fully discharged through the secondary winding Ls, the switching transistor Q1 continues to be turned off. When the excitation energy of the transformer T has been fully discharged, the induced voltage of the feedback winding $L_f$ disappears rapidly, but because of the leakage induction and distributed capacitance of the transformer T a ringing voltage (kick voltage) is generated so as to forward bias the base of the switching transistor Q1 and the switching transistor Q1 is turned on again. After that, the above-mentioned turn-on and turn-off operation is repeated so that the oscillation grows and continues.

Here, when $V_{out}$ represents an output voltage of the rectifying and smoothing circuit 2, $I_{out}$ a current flowing in the load, Lp an inductance of the primary winding $L_p$, and $I_{cp}$ the peak value of the collector current of the switching transistor Q1, the output voltage Vout can be given by the following approximate expression.

$$V_{out} = (L_p \cdot I_{cp}^2)/(2\ I_{out}) \qquad (1)$$

Further, when $t_{on}$ represents a turn-on time of the switching transistor Q1, and Vin a voltage applied between the terminals of the primary winding $L_p$, then $I_{cp}$ is given by the following expression.

$$I_{cp} = (Vin/L_p)\ t_{on} \qquad (2)$$

From the relation shown by the expressions (1), (2), by detecting the output voltage and adjusting the current of the photo-transistor in the photo coupler PC and by controlling the turn-on time of the switching transistor Q1, the output voltage $V_{out}$ can be kept constant.

Then, in the conventional self-oscillation type switching power supply shown in FIG. 12, the output voltage is, for example, as low as 5 V, and the transformer is a step-down transformer. In the construction of the conventional power supply shown in FIG. 12, if the turn ratio of the secondary winding Ls to the primary winding $L_p$ of the transformer T is raised, a power supply for generating a high voltage can be theoretically constructed, but the following problems arise.

Figure 13:
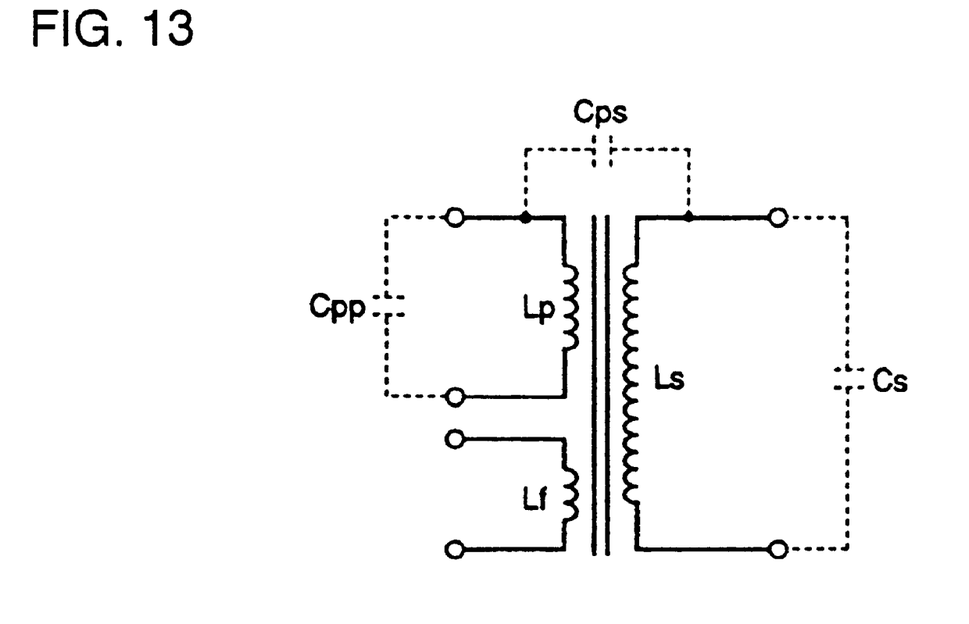
FIG. 13 is a circuit diagram of a transformer portion.

FIG. 13 is a circuit diagram of a transformer. $C_s$ represents a distributed capacitance between the terminals of the secondary winding Ls and $C_{ps}$ represents a distributed capacitance generated between the primary winding $L_p$ and secondary winding Ls. Further, $C_{pp}$ represents the distributed capacitance $C_s$ and $C_{ps}$ changed as a capacitance between the terminals of the primary winding $L_p$. For example, in an electrophotographic copier and page printer a power supply to multiply a DC input voltage of tens V to a DC or AC voltage of hundreds to thousands V is required, but in order to realize such a performance the turn ratio of the secondary winding Ls to the primary winding $L_p$ must be increased to a great extent. Here, when $N_p$ represents the number of turns of the primary winding $L_p$, Ns the number of turns of the secondary winding $L_s$, $C_s$ and $C_{ps}$ the value of distributed capacitance $C_s$ and $C_{ps}$ respectively, a distributed capacitance $C_{pp}$ changed as a capacitance between the terminals of the primary winding $L_p$ is given by the following approximate expression.

$$C_{pp}=(C_s+C_{ps})\times(N_s/N_p)^2 \qquad (3)$$

Accordingly, the capacitance $C_{pp}$ in a high-voltage transformer becomes extremely large compared with that in a low-voltage transformer.

When the transformer T in FIG. 12 is replaced with the high-voltage transformer shown in FIG. 13, the primary converted distributed capacitance $C_{pp}$ of the transformer becomes extremely large compared with that of the low-voltage transformer. Therefore, when the switching transistor is turned on, excess current flows and switching loss is increased, and also the amplitude of the ringing component superposed on the collector current of the switching transistor is increased. As a result, the output voltage control or output current control is adversely affected. This is caused by the fact that, as shown in the expression (3), the distributed capacitance $C_{pp}$ converted as the capacitance between the terminals of the primary winding becomes extremely large.

Figure 14:
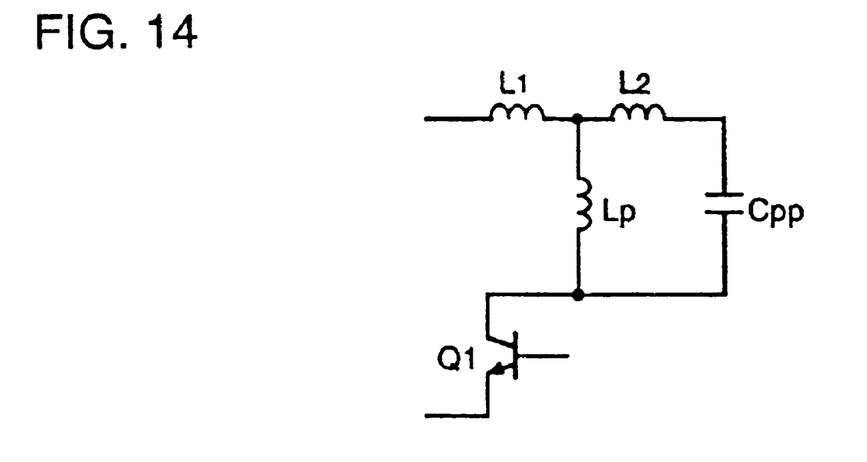
FIG. 14 is an equivalent circuit diagram of a transformer and switching transistor portion.
Figure 15:
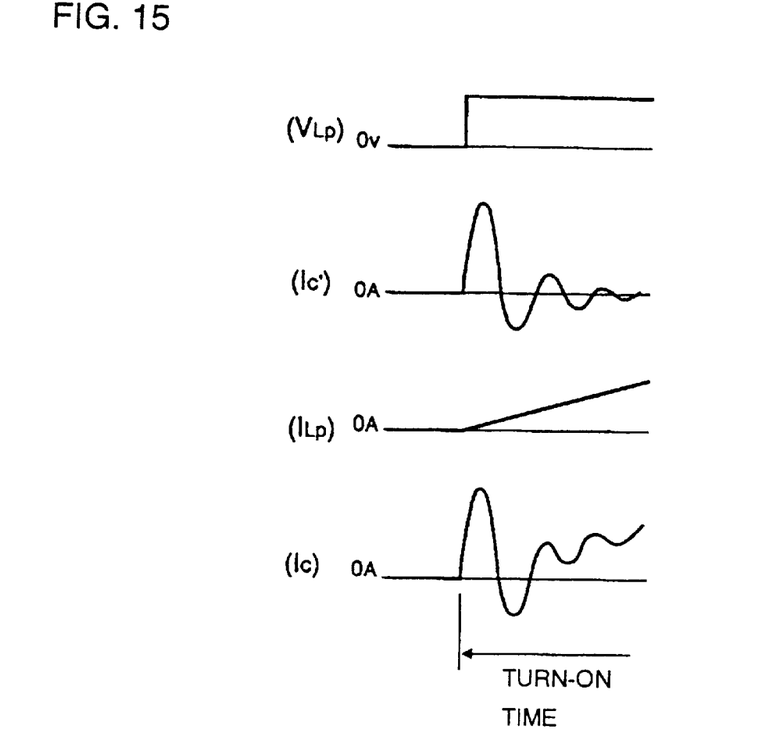
FIG. 15 shows voltage or current waveforms of FIG. 14.
Figure 16:
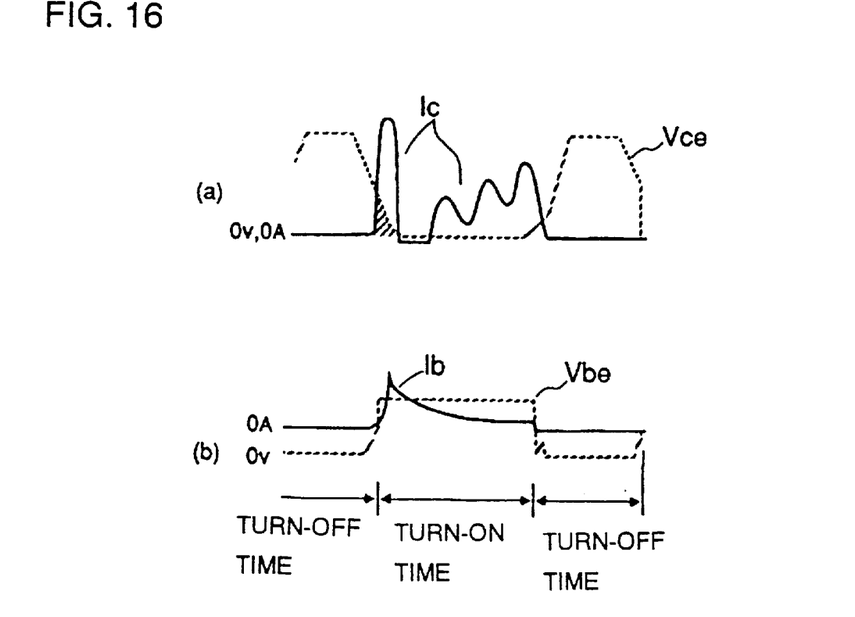
FIG. 16 shows voltage and current waveforms of FIG. 14.

Here, an equivalent circuit of the high-voltage transformer is shown in FIG. 14. In the drawing L1 and L2 represents a leakage inductance, $L_p$ an inductance of the primary winding, and $C_{pp}$ a primary converted distributed capacitance. FIG. 15 is the diagram of a waveform showing the collector current of the switching transistor Q1 and others. FIG. 16 is the diagram of the waveform showing the relation between the collector voltage and current and between the base voltage and current of the switching transistor Q1. In FIG. 15 $V_{Lp}$ represents the waveform of the applied voltage to the primary winding, $I_c'$ the current flowing in the primary converted distributed capacitance $C_{pp}$, $I_{Lp}$ the current flowing in the primary winding, and $I_c$ the collector current of the switching transistor Q1. When the switching transistor Q1 is turned on, the current $I_c'$ flows through the capacitance $C_{pp}$ in such a way that initially excess current to charge the capacitance $C_{pp}$ flows and after completion of the charge the capacitance $C_{pp}$ becomes resonant with the leakage inductance (L1, L2) and the oscillation is repeatedly damped. The combined current of $I_c'$ and $I_{Lp}$ flows through the collector of the switching transistor Q1, and accordingly as shown by $I_c$ in FIG. 15 excess current flows initially and then the current with ringing is increased at a slope of $V_{Lp}/L_p$. At this time, the ringing component superposed on the collector current $I_c$ has adverse effects of inducing intermittent operation and others on the controlling method to stabilize the output by adjustment of the turn-on time of the switching transistor Q1.

Further, in FIG. 16 $V_{ce}$ represents a voltage between the collector and emitter of the switching transistor Q1, $I_c$ a collector current of the transistor Q1, $V_{be}$ a voltage between the base and emitter of the transistor Q1, and $I_b$ a base current of the transistor Q1. Because of excess current flowing in the collector of the switching transistor Q1 when the transistor Q1 is turned on, as shown by the hatched area in FIG. 16 (a), large switching loss is caused by the product of the collector current and the voltage between the collector and emitter at the time when the switching transistor Q1 is turned on.

Figure 17:
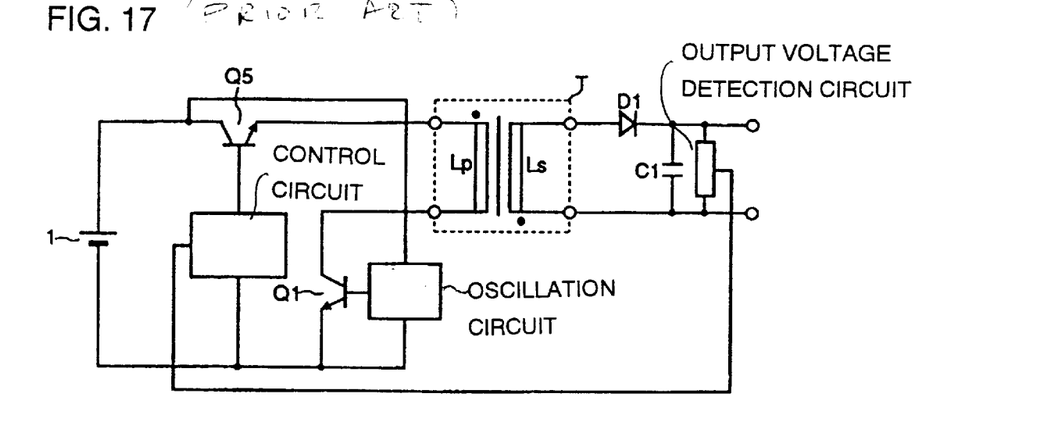
FIG. 17 shows a construction of a conventional high-voltage switching power supply.

In order to solve the above-mentioned problems, in conventional high-voltage power supplies, as shown in FIG. 17 it was common to stabilize an output by adjusting a DC input voltage to be input to the primary winding of a high-voltage transformer, not by adjusting the turn-on time of a switching transistor Q1. In FIG. 17 a transistor Q5 is a controlling power transistor to step down the voltage of a DC input power supply 1 and adjust the input voltage to a high-voltage transformer T. A control circuit stabilizes an output voltage by controlling the base current of the transistor Q5 in accordance with a detected signal from an output voltage detection circuit. The switching transistor Q1 is always turned on and off at a constant cycle by an oscillation circuit.

However, in the circuit shown in FIG. 17, a construction of a separate excitation type switching power supply is required, and accordingly an oscillation circuit is externally required and in addition a power transistor to step down the input voltage to the high-voltage transformer is separately required. As a result, the circuit construction becomes complicated and large-sized.

SUMMARY OF THE INVENTION

An object of the invention is to provide a power supply, that is, a self-oscillation type switching power supply using a high-voltage transformer which solves the above-mentioned problems, and which is able to cope with a widely changing load or to change its output voltage (current) over a wide range.

Another object of the present invention is to provide a self-oscillation type switching power supply having a high efficiency by suppressing the increase of switching loss.

According to the present invention, in a self-oscillation type switching power supply comprising a transformer having a primary winding, a secondary winding, a feedback winding, and a control winding as required, a switching transistor to turn on and off a current flowing in the primary winding, a controlling transistor to control a positive feedback signal from the feedback winding or the control winding to said switching transistor, and a time constant circuit to charge a generated voltage across the feedback winding or the control winding with a fixed time constant and to give a controlling voltage to said controlling transistor, in order to suppress the amplitude of excess current and a ringing component following the excess current at the time when the switching transistor is turned on, a delay transistor to delay the turn-on of said switching transistor is included in a controlling signal input portion to said switching transistor, and a delay circuit to delay a positive feedback signal from the control winding or the feedback winding with a fixed time constant and to give the delayed signal as a controlling signal to said delay transistor is provided. Further, a delay circuit to delay a positive feedback signal from the control winding with a fixed time constant and to give the delayed signal as a controlling signal to said controlling transistor is also provided.

Because of this construction, the controlling transistor or the delay transistor is driven by a voltage lagging in phase the voltage induced across the control winding or feedback winding, and accordingly the turn-on of the switching transistor is delayed by a delayed time in the delay circuit. Therefore, at the time when the applied voltage to the switching transistor has become low, the switching transistor is turned on. Then excess current to charge the primary winding capacitance of the high-voltage transformer is suppressed and the amplitude of a ringing component flowing in the switching transistor during its turn-on time is also suppressed. As a result, control of the output voltage (current) by controlling the turn-on time of the switching transistor through the controlling transistor can take place in a stable manner over a wide range. Further, the switching loss can be reduced at the time when the switching transistor is turned on.

Further, in the present invention, a delay transistor to delay the turn-on of said switching transistor is contained in a controlling signal input portion to said switching transistor, and a bias voltage generating circuit to be charged by a generated voltage across the control winding or the feedback winding and to give a DC bias to a controlling voltage to the delay transistor is provided between a controlling voltage input portion to the delay transistor and the control winding or the feedback winding. Furthermore, a bias voltage generating circuit to be charged by a generated voltage across the control winding and to give a DC bias to a controlling voltage to said controlling transistor is provided between a controlling voltage input portion to said controlling transistor and the control winding.

According to this construction, because the controlling transistor or the delay transistor is controlled by a positive or negative DC component superposed on a voltage induced across the control winding or the feedback winding, at the time when the applied voltage to the switching transistor has become low the switching transistor can be turned on and accordingly excess current to charge the primary winding capacitance of the high-voltage transformer can be suppressed, and then the amplitude of the ringing component flowing in the switching transistor during its turn-on time can be suppressed. As a result, control of the output voltage (current) by controlling the turn-on time of the switching transistor by means of the controlling transistor can take place in a stable manner over a wide range. Further, the switching loss at the time when the switching transistor is tuned on, can be reduced.

Furthermore, in the present invention, a delay transistor to delay the turn-on of said switching transistor may be provided in a controlling signal input portion to said switching transistor, and an impedance circuit to prevent a backward bias to the delay transistor from the control winding or the feedback winding may be provided between a controlling voltage input portion to the delay transistor and the control winding or the feedback winding. Furthermore, an impedance circuit to prevent a backward bias to said controlling transistor from the control winding may be provided between a controlling voltage input portion to said controlling transistor and the control winding.

Because of this construction, the backward bias of the controlling transistor or the delay transistor is prevented, and accordingly when the switching transistor is turned on, a voltage is generated across the control winding or the feedback winding so as to backward bias the delay transistor or the controlling transistor. However, by the operation of the above-mentioned impedance circuit, the backward bias is prevented and accordingly the turn-off of the controlling transistor or the delay transistor is delayed for a short time because of the carrier storage effect of the transistor. Because the switching transistor continues to be turned off during the time period, at the time when the applied voltage to the switching transistor has become low the switching transistor can be turned on and accordingly excess current to charge the primary winding capacitance of the high-voltage transformer can be suppressed, and then the amplitude of the ringing component flowing in the switching transistor during its turn-on time can be suppressed. As a result, control of the output voltage (current) by controlling the turn-on time of the switching transistor by means of the controlling transistor can take place in a stable manner over a wide range. Further, the switching loss at the time when the switching transistor is tuned on, can be also reduced.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWINGS

FIG. 12 is a circuit diagram of a self-oscillation type switching power supply relating to a ninth emodiment.

DETAILED DESCRIPTION OF EMBODIMENTS OF THE INVENTION

Hereinafter, the preferred embodiments of the present invention are explained in detail with reference to the drawings.

Figure 1:
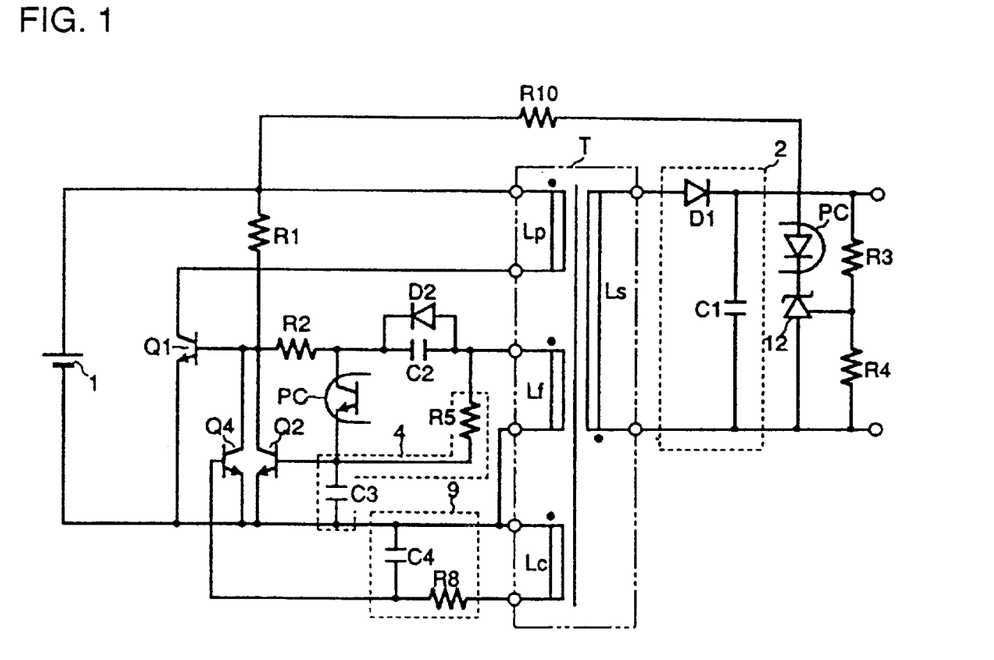
FIG. 1 is a circuit diagram of a self-oscillation type switching power supply relating to a first embodiment.

A circuit diagram of a self-oscillation type switching power supply relating to a first embodiment of the present invention is shown in FIG. 1. In the drawing numeral 1 represents an input power supply and T represents a high-voltage transformer having a primary winding $L_p$, a secondary winding Ls, a feedback winding $L_f$ and a control winding $L_c$. Q1 is a switching transistor connected to a DC power supply through a primary winding $L_p$ of a high-voltage transformer. To the base of the switching transistor Q1 a starting resistor R1 is connected. Between the feedback winding $L_f$ and the base of the switching transistor Q1 a current-limiting resistor R2, a speed-up capacitor C2, and a diode D2 are connected. Between the base and emitter of the switching transistor Q1 a controlling transistor Q2 and a delay transistor Q4 are connected. The feedback winding $L_f$ is coupled to a time constant circuit 4 comprising a resistor R5 and a capacitor C3. The circuit 4 is connected so that the voltage across the capacitor C3 is applied to the base of the controlling transistor Q2. Further, between the control winding $L_c$ and the delay transistor Q4 a delay circuit 9 made up of a resistor R8 and a capacitor C4 is disposed, and the circuit 9 is connected so that the voltage across the capacitor C4 is applied to the base of the delay transistor Q4.

Furthermore, to the secondary winding Ls of the high-voltage transformer T, a rectifying and smoothing circuit 2 made up of a rectifier diode D1 and a smoothing capacitor C1 are connected. To the output side of the rectifying and smoothing circuit 2, a voltage-dividing resistor circuit made up of resistors R3 and R4 and a variable shunt regulator 12 is connected. Furthermore, between the variable shunt regulator 12 and the input power supply a light-emitting diode as a photo coupler is connected through a current-limiting resistor R10. A photo-transistor related to this photo coupler is connected in a circuit for charging capacitor C3.

The operation of the power supply 1 shown in FIG. 1 is as in the following. When a DC voltage is applied by the input power supply 1, a very small amount of starting current flows into the base of the switching transistor Q1 through the starting resistor R1. As a result, a current flows through the collector of the transistor Q1 and a voltage between the collector and emitter decreases. Then, a voltage is applied between the terminals of the primary winding $L_p$ of the high-voltage transformer T and an induced voltage proportional to the applied voltage is generated across the feedback winding $L_f$. Because of this induced voltage, a positive feedback current is supplied to the base of the switching transistor Q1 through the current-limiting resistor R2, and the speed-up capacitor C2 and the diode D2 in parallel, and the transistor Q1 is turned to the ON state (saturation). When the transistor Q1 is turned on, a DC voltage is applied between the terminals of the primary winding $L_p$ of the high-voltage transformer T, which causes a current to flow through the primary winding $L_p$ and as a result the excitation of the high-voltage transformer T takes place. At this time, the induced voltage generated across the feedback winding at the same time charges the capacitor C3 through the resistor R5, speed-up capacitor, diode D2, and photo coupler PC. When the charged voltage of this capacitor C3 reaches the threshold voltage (about 0.6 V) between the base and emitter of the controlling transistor Q2, the base and emitter of the switching transistor Q1 is short circuited. This cuts off the base current of the switching transistor Q1 to turn off the transistor Q1 rapidly. Accordingly, the duration in which the switching transistor Q1 is turned on is equal to the time from start of charging the capacitor C3 to the time when the voltage across the capacitor C3 reaches about 0.6 V. When the switching transistor Q1 is turned off, the base of the switching transistor Q1 is reverse biased to a negative potential by the induced voltage across the feedback winding $L_f$. At the same time the electric charge of the capacitor C3 is forced to discharge (reverse charge) by the feedback winding $L_f$ through the resistor R5, and so the base of the controlling transistor Q2 is reverse biased to a negative potential. As a result, the OFF state of the switching transistor Q1 is maintained. While the switching transistor Q1 is turned off, because the high-voltage transformer T freely oscillates at the resonance frequency, a voltage is induced across the feedback winding so as to forward bias the base of the switching transistor Q1 and the switching transistor Q1 is again turned on. Then, the above-mentioned turn-on and turn-off operation is repeated and the oscillation grows and continues.

Now, when a case in which an output voltage increases is examined, because the collector current flowing through the photo transistor constituting the photo coupler PC is increased, the current charging the capacitor 3 is increased. Accordingly, when the output voltage is increased, the voltage build-up rate of the capacitor C3 is raised and the charging time constant is lowered. This causes the turn-on time of the switching transistor Q1 to be shortened. That is, after the switching transistor Q1 has been turned on and the positive feedback signal from the feedback winding $L_f$ has been generated, in a short period of time the controlling transistor Q2 is turned on and the switching transistor Q1 is tuned off. Because of the turn-off of the switching transistor Q1, a negative voltage is induced across the feedback winding $L_f$ and the electric charge of the capacitor C3 is discharged (reverse charged) through the resistor R5 and the feedback winding $L_f$. On the contrary, when the output voltage is reduced, the above-described operation is reversed and the charging time constant is increased and the ON state of the switching transistor Q1 is lengthened. In this way the output voltage is stabilized.

Figure 2:
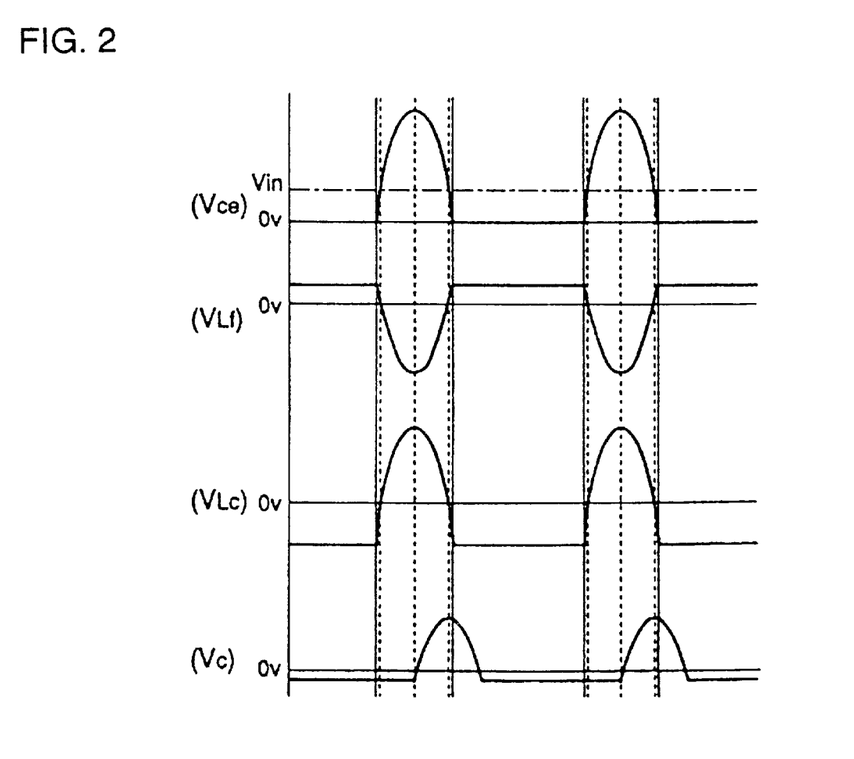
FIG. 2 shows voltage waveforms of FIG. 1.

Now, in FIG. 1 numeral 9 shows a delay circuit constituting an integrating circuit made up of a resistor R8 and a capacitor C4. The control winding $L_c$ is connected to have a polarity so that the delay transistor Q4 is reverse biased while the switching transistor Q1 is turned on and the delay transistor Q4 is forward biased while the switching transistor Q1 is turned off. As the delay circuit 9 integrates the induced voltage across the control winding $L_c$ by means of the resistor R8 and capacitor C4, the voltage across the capacitor C4 is about 90° delayed in phase from the induced voltage across the control winding $L_c$, and the amplitude gives a voltage waveform decreasing in accordance with a gain to be determined by the values of the resistor R8 and capacitor C4. Here, when $V_{ce}$ represents a voltage between the collector and emitter of the switching transistor Q1, $V_{Lf}$ an induced voltage across the feedback winding $L_f$, $V_{Lc}$ an induced voltage of the control winding $L_c$, and $V_c$ a voltage across the capacitor C4, the voltage waveform of each is shown as in FIG. 2. Because as shown by $V_c$ in FIG. 2 a voltage delayed in phase from the induced voltage $V_{Lf}$ across the feedback winding $L_f$ is applied to the base of the delay transistor Q4 as described above, even if a positive feedback voltage to help turn on the switching transistor Q1 is induced across the feedback winding $L_f$, the delay transistor Q4 continues to short circuit the base and emitter of the switching transistor Q1 until the voltage across the capacitor C4 becomes lower than the threshold voltage (about 0.6 V) of the delay transistor Q4. Therefore, by delaying the turn-on of the switching transistor Q1 so that a positive feedback current is supplied after the voltage $V_{ce}$ has been nearly 0 V by resonance when the switching transistor is turned on, initial excess current flowing in the collector of the switching transistor Q1 is suppressed. As a result, the switching loss is reduced to a great extent. Further, because the amplitude of a ringing component superposed on the collector current during the ON state of the transistor Q1, the time of the ON state of the switching transistor referenced to a detected output voltage can be appropriately controlled.

Figure 3:
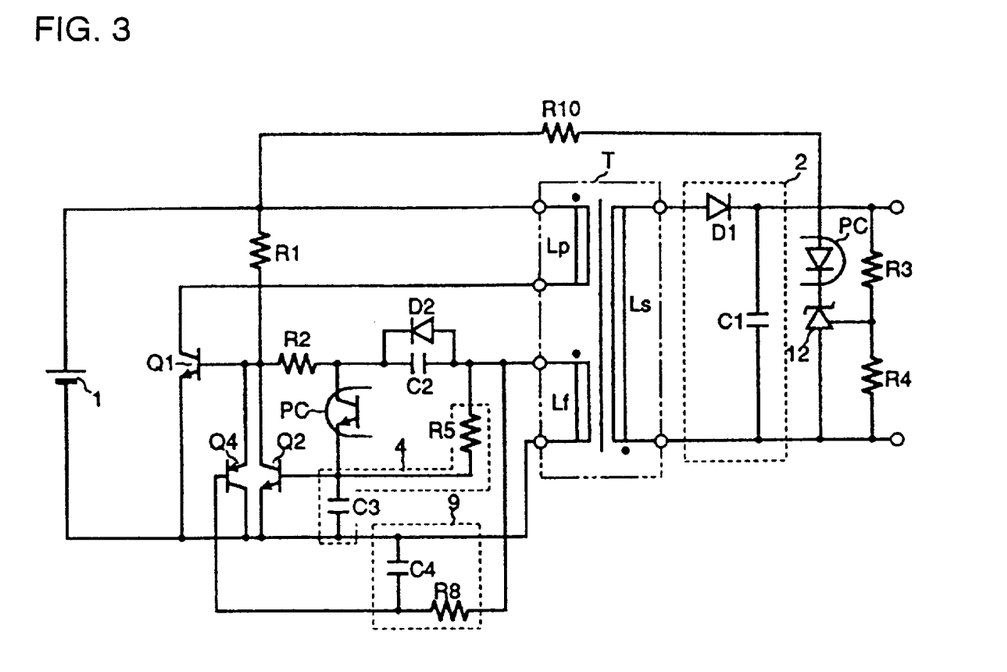
FIG. 3 is a circuit diagram of a self-oscillation type switching power supply relating to a second embodiment.

Next, a circuit of a self-oscillation type switching power supply relating to a second embodiment is shown in FIG. 3. Different from the circuit shown in FIG. 1, this example is devised to have the same operation-effect using a PNP transistor for the delay transistor Q4, but without using the control winding. In FIG. 3, the capacitor C4 is charged to have a polarity so that the delay transistor Q4 is reverse biased while the switching transistor Q1 is turned on and that the delay transistor Q4 is forward biased while the switching transistor Q1 is turned off. Accordingly, in the same way as in the first embodiment by delaying the turn-off of the switching transistor Q1, initial excess current flowing in the collector of the switching transistor Q1 is suppressed and switching loss is greatly reduced. Further, because the amplitude of a ringing component superposed on the collector current is suppressed during the ON state of the transistor Q1, the turn-on time of the switching transistor corresponding to a detected output voltage can be appropriately controlled.

Figure 4:
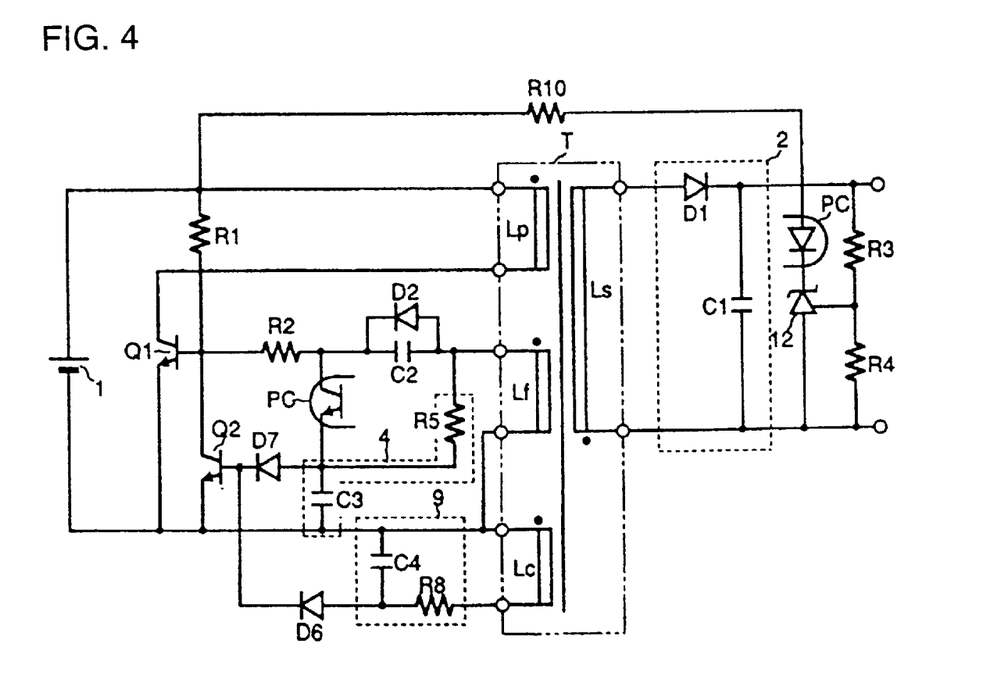
FIG. 4 is a circuit diagram of a self-oscillation type switching power supply relating to a third embodiment.

FIG. 4 is a circuit diagram of a self-oscillation type switching power supply relating to a third embodiment. This circuit is different from the circuit shown in FIG. 1, although it has the same operation-effect, because it does not require the delay transistor Q4 in FIG. 1. That is, in FIG. 4 the output of the impedance circuit 9 made up of an integrating circuit is connected to the base of the controlling transistor Q2 through a reverse current preventing diode D6. Further, between a time constant circuit 4 and the base of the controlling transistor Q2 a reverse current preventing diode D7 is inserted. According to this construction, it is also possible to make the delay transistor Q4 serve as the controlling transistor Q2 in FIG. 1.

Moreover, diodes D6 and D7 were used in FIG. 4, but these can be replaced by Zener diodes, respectively, to have the same operation-effect.

Next, the construction of a self-oscillation type switching power supply relating to a fourth embodiment is explained with reference to FIGS. 5 and 6.

Figure 5:
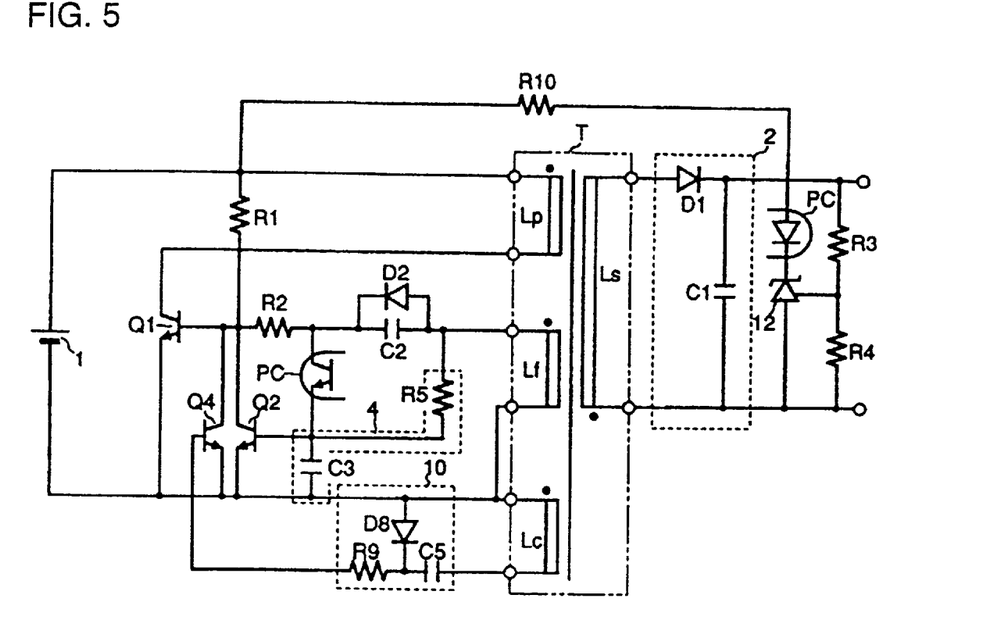
FIG. 5 is a circuit diagram of a self-oscillation type switching power supply relating to a fourth embodiment.
Figure 6:
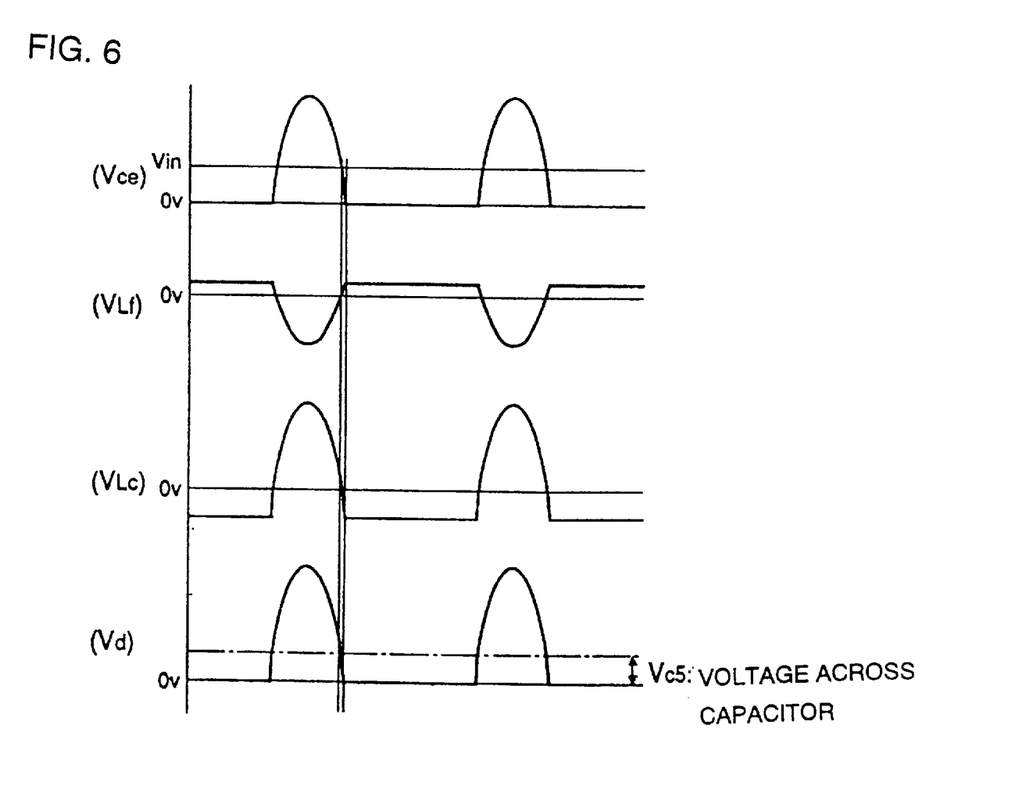
FIG. 6 shows voltage waveforms of FIG. 5.

FIG. 5 is the circuit diagram and what is different from the circuit shown in FIG. 1 is the construction of the impedance circuit. In FIG. 5 a bias voltage generating circuit 10 comprises a capacitor C5, a diode D8, and a resistor R9. Here, when Vin represents an applied voltage to the primary winding $L_p$, $N_p$ the number of turns of the primary winding, and $N_c$ the number of turns of the control winding $L_c$, the induced voltage $V_{Lc}$ across the control winding is given by $V_{Lc}=(N_c/N_p)$ Vin and when the forward voltage of the diode 8 is represented by $V_f$, the voltage $V_{C5}$ across the capacitor C5 is given by $(V_{Lc}-V_f)$. When $V_{ce}$ represents the voltage between the collector and emitter of the switching transistor Q1, $V_{Lf}$ the induced voltage across the feedback winding, $V_{Lc}$ the induced voltage of the control winding $L_c$, and $V_d$ the cathode electric potential of the diode D8, each voltage waveform is as shown in FIG. 6. Because as shown by $V_d$ in FIG. 6 a voltage $V_{sf}$ across the capacitor C5 superposed on an induced voltage $V_{Lc}$ of the control winding is applied to the base of the delay transistor Q4, even if a positive feedback voltage to help turn on the switching transistor Q1 is induced across the feedback winding Lf, the delay transistor Q4 continues to short circuit the base and emitter of the switching transistor Q1 until the cathode electric potential of the diode D8 becomes lower than the threshold voltage (about 0.6 V) of the delay transistor Q4. Because of this, by delaying the turn-on of the switching transistor Q1 for a short time so that a positive feedback current is supplied after the voltage $V_{ce}$ has been nearly 0 V by resonance when the switching transistor Q1 is turned on, initial excess current flowing in the collector of the switching transistor Q1 is suppressed. As a result, the switching loss is reduced to a great extent. Further, because of the amplitude of a ringing component superposed on the collector current during the turn-on time of the transistor Q1 is suppressed, the turn-on time of the switching transistor corresponding to a detected output voltage can be appropriately controlled.

Figure 7:
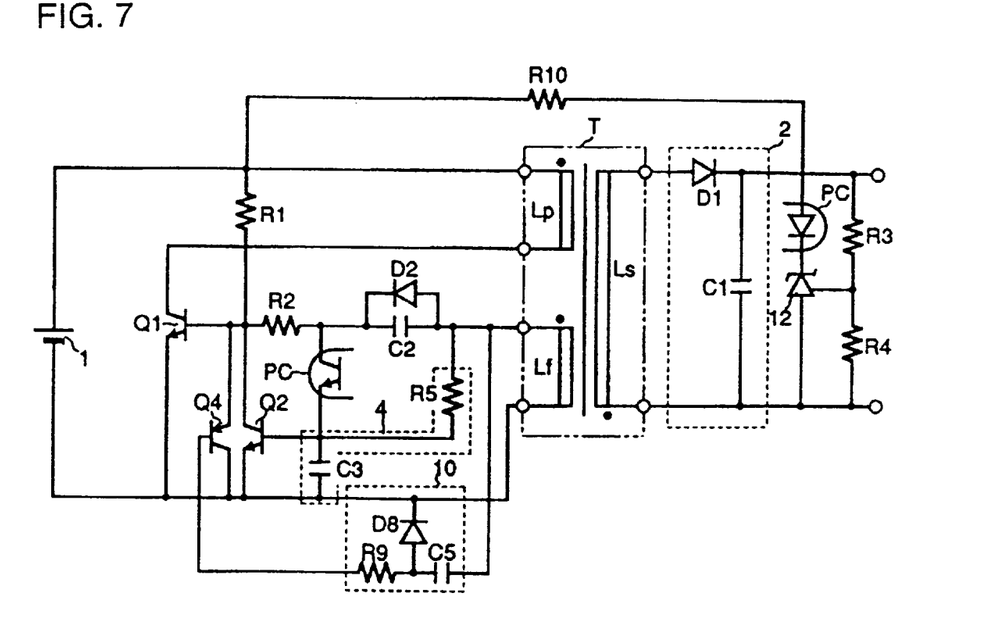
FIG. 7 is a circuit diagram of a self-oscillation type switching power supply relating to a fifth embodiment.

FIG. 7 is a circuit diagram of a self-oscillation type switching power supply relating to a fifth embodiment. Different from the circuit shown in FIG. 5, this example is devised to have the same operation-effect using a PNP transistor for the delay transistor Q4 and without using the control winding. As shown in FIG. 7, the polarity of the bias voltage generated by the bias voltage generating circuit 10 is reversed from that in FIG. 5. By such a construction, in the same way as the circuit shown in FIG. 5, the turn-on of the switching transistor Q1 is delayed for a short time and excess current initially flowing in the collector of the switching transistor Q1 is suppressed. As a result, the switching loss is reduced to a great extent. Further, because of the amplitude of a ringing component superposed on the collector current during the turn-on time of the transistor Q1, the time of the turn-on of the switching transistor corresponding to a detected output voltage can be appropriately controlled.

Figure 8:
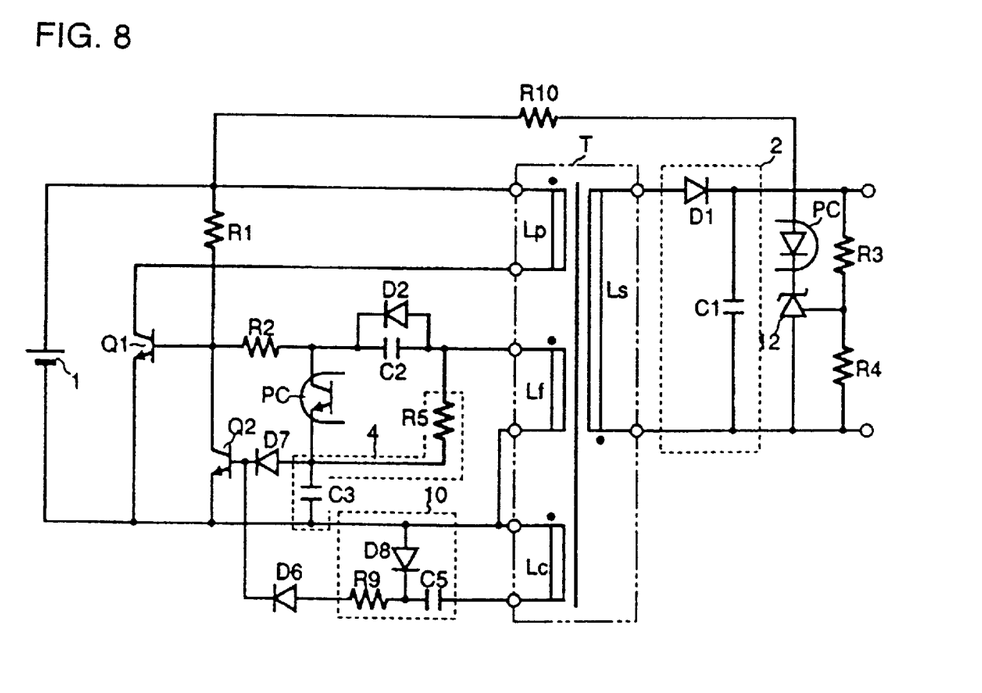
FIG. 8 is a circuit diagram of a self-oscillation type switching power supply relating to a sixth embodiment.

FIG. 8 is a circuit diagram of a self-oscillation type switching power supply relating to a sixth embodiment. What is different from the circuit shown in FIG. 5, although having the same operation-effect, is that the delay transistor Q4 in FIG. 5 is not used. That is, in FIG. 8 the output of the bias voltage generating circuit 10 is connected to the base of the controlling transistor Q2 through a reverse current preventing diode D6. Further, between the time constant circuit 4 and the base of the controlling transistor Q2 a reverse current preventing diode D7 is inserted. According to this construction, it is also possible to make the delay transistor Q4 in FIG. 5 serve as the controlling transistor Q2.

Further, in FIGS. 5, 7 or FIG. 8 by connecting an impedance circuit, for example, made up of resistors to the capacitor C5 or the diode D8 in parallel, the quantity of electric charge discharged from the capacitor C5 can be adjusted, and accordingly the turn-on delay time can be fine adjusted.

Furthermore, diodes D6 and D7 were used in FIG. 8, but these can be replaced by Zener diodes, respectively, to have the same operation-effect.

Figure 9:
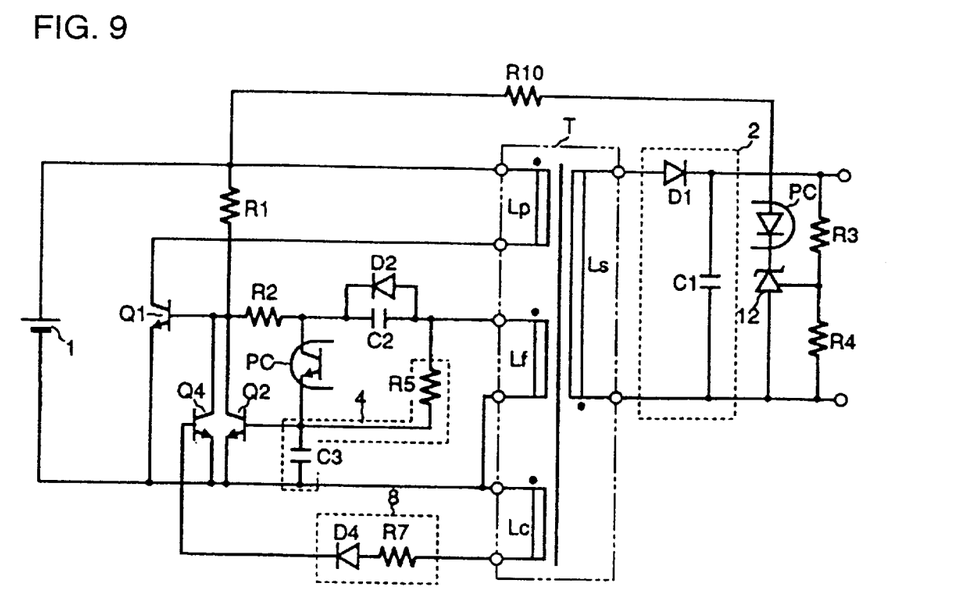
FIG. 9 is a circuit diagram of a self-oscillation type switching power supply relating to a seventh embodiment.

FIG. 9 is a circuit diagram showing a construction of a self-oscillation type power supply relating to a seventh embodiment. What is different from the circuit shown in FIG. 1 is the circuit construction between the control winding Lc and the delay transistor Q4. In this example, the impedance circuit 8 comprises a current-limiting resistor R7 and a diode D4. In this case, because of the resonance oscillation of the high-voltage transformer, a voltage to forward bias the base of the switching transistor Q1 is induced across the feedback winding to help turn on the switching transistor Q1, but the carrier stored in the delay transistor Q4 can not be drawn off by blocking of the diode D4 and accordingly the transistor Q4 continues to be on for a short time to delay the timing of turn-on of the switching transistor Q1 for a short time. As a result, unstable operation such as an intermittent operation is prevented and the output voltage (current) is made to be able to change over a wider range under a stabilized condition.

Figure 10:
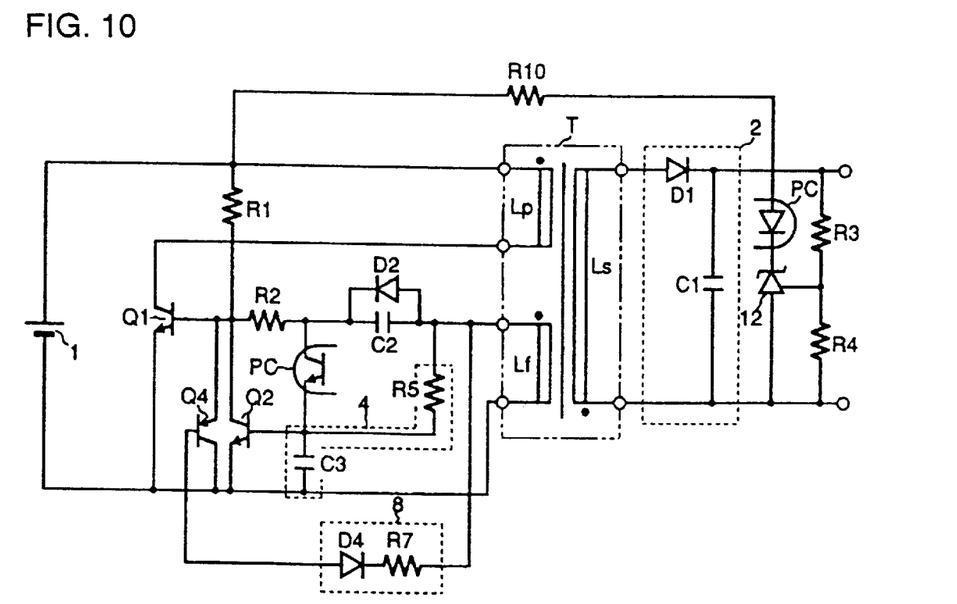
FIG. 10 is a circuit diagram of a self-oscillation type switching power supply relating to an eighth embodiment.

FIG. 10 is a circuit diagram of a self-oscillation type switching power supply relating to an eighth embodiment. Different from the circuit shown in FIG. 9, this example is devised to have the same operation-effect using a PNP transistor for the delay transistor Q4 and without using the control winding. As shown in FIG. 10, the polarity of the diode D4 in the impedance circuit 8 is reversed from that in FIG. 9. By such a construction, the timing of turn-on of the switching transistor Q1 is delayed for a short time. As a result, unstable operation such as an intermittent operation is prevented and the output voltage (current) is made to be able to change over a wider range under a stabilized condition.

Figure 11:
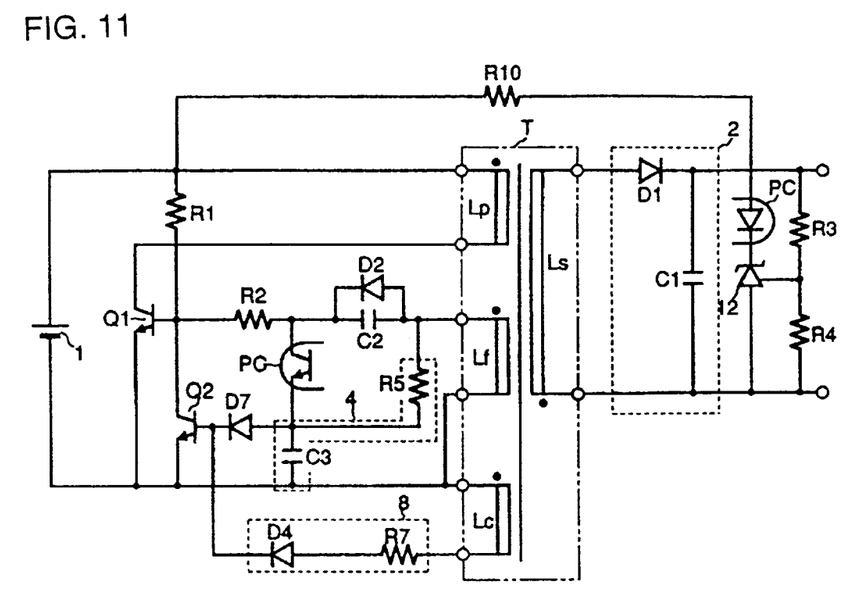

FIG. 11 is a circuit diagram of a self-oscillation type power supply relating to a ninth embodiment. What is different from the circuit shown in FIG. 9, although having the same operation-effect, is that the delay transistor Q4 of FIG. 9 is not used. That is, in FIG. 11 the output of the impedance circuit 8 is connected to the base of the controlling transistor Q2. Further, between the time constant circuit 4 and the base of the controlling transistor Q2 a reverse current preventing diode D7 is inserted. According to this construction, it is also possible to make the delay transistor Q4 in FIG. 9 serve as the controlling transistor Q2.

Moreover, the diode D6 in FIGS. 9 and 10 or the diodes D4 and D7 in FIG. 11 can be replaced by Zener diodes, respectively, to have the same operation-effect.

Furthermore, when an impedance circuit comprising, for example, resistors is connected between the base and emitter of the delay transistor Q4 in FIGS. 9 and 10 or between the base and emitter of the controlling transistor Q2 in FIG. 11, while the switching transistor Q1 is turned on, between the base and emitter of the above-mentioned transistor Q4 or Q2 a certain impedance is connected, but it is not open-circuit between them, and therefore the carrier storage effect by the transistor Q4 or Q2 is decreased. By making use of this fact, the turn-on delay time of the switching transistor Q1 can be fine adjusted, and a stable delay time is made available.

Further, when a capacitor is connected in parallel to a resistor R5 in a time constant circuit shown in each embodiment, even if the positive feedback voltage signal from the feedback winding is of a high frequency, the transistor Q3 can be driven and accordingly the output control range can be further expanded.

Moreover, regarding the part of the delay transistor Q4 shown in each of the embodiments, instead of a single unit of transistor, a photo-transistor as a photo coupler may be used. For example, in FIG. 1 a photo-transistor as a photo coupler may be substituted for the transistor Q4 to connect the anode of the light-emitting diode of the photo coupler to the output of the impedance circuit 9 and to connect the cathode to the emitter of the photo-transistor.

Moreover, in each embodiment a bipolar transistor was used for each transistor, but a unipolar transistor may be also used for each transistor.

Furthermore, in each embodiment a power supply circuit to output a constant voltage was shown, but by adopting a circuit construction for feedback control by means of detecting an output current the present invention can be also applicable to a power supply circuit to output a constant current.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A self-oscillation type switching power supply comprising a transformer having a primary winding, a secondary winding, and at least one control winding, a switching transistor to turn on and off a current flowing in the primary winding, a controlling transistor to control a feedback signal from the at least one control winding to said switching transistor, and a time constant circuit charged by a voltage generated across the at least one control winding and providing a controlling voltage to said controlling transistor, and further comprising a delay circuit to delay the turn-on of said switching transistor coupled to said switching transistor, the delay circuit delaying a control signal from the at least one control winding and converting the control signal into a delayed control signal to control the turn-on of said switching transistor.

2. The self-oscillation type switching power supply of claim 1, wherein the delay circuit comprises a delay transistor.

3. The self-oscillation type switching power supply of claim 2, wherein the delay circuit further comprises a resistor-capacitor circuit.

4. The self-oscillation type switching power supply of claim 2, wherein the delay transistor is coupled in parallel with said controlling transistor.

5. The self-oscillation type switching power supply of claim 1, further comprising a second control winding of said transformer, the control signal being generated by said second control winding.

6. The self-oscillation type switching power supply of claim 1, wherein the control signal is derived from said feedback signal.

7. The self-oscillation type switching power supply of claim 6, wherein the at least one control winding comprises a single control winding.

8. A self-oscillation type switching power supply comprising a transformer having a primary winding, a secondary winding, and at least one control winding, a switching transistor to turn on and off a current flowing in the primary winding, a controlling transistor to control a feedback signal from the at least one control winding to said switching transistor, and a time constant circuit charged by a voltage generated across the at least one control winding and providing a controlling voltage to said controlling transistor, and further comprising a delay circuit to delay a control signal from the at least one control winding and to provide the control signal as a delayed controlling signal to control said controlling transistor.

9. The self-oscillation type switching power supply of claim 5, wherein the delay circuit comprises a resistor-capacitor circuit.

10. The self-oscillation type switching power supply of claim 9, wherein the delay circuit further comprises a diode coupled to the controlling transistor.

11. The self-oscillation type switching power supply of claim 8, further comprising a second control winding of said transformer, said second control winding generating the control signal.

12. A self-oscillation type switching power supply comprising a transformer having a primary winding, a secondary winding, and at least one control winding, a switching transistor to turn on and off a current flowing in the primary winding, a controlling transistor to control a feedback signal from the at least one control winding to said switching transistor, and a time constant circuit charged by a voltage generated across the feedback winding and providing a controlling voltage to said controlling transistor, and further comprising a delay transistor to delay the turn-on of said switching transistor disposed in a controlling signal input portion to said switching transistor, and a bias voltage generating circuit charged by a voltage generated by the at least one control winding and providing a DC bias to a controlling voltage to said delay transistor, the bias voltage generating circuit provided between a controlling voltage input portion to said delay transistor and the at least one control winding.

13. The self-oscillation type switching power supply of claim 12, wherein the bias voltage generating circuit comprises a resistor, capacitor and diode.

14. The self-oscillation type switching power supply of claim 12, wherein the delay transistor is coupled in parallel said controlling transistor.

15. The self-oscillation type switching power supply of claim 12, further comprising a second control winding of said transformer, the voltage generated by the at least one control, winding converted to the DC bias being generated by said second control winding.

16. A self-oscillation type switching power supply comprising a transformer having a primary winding, a secondary winding, and at least one control winding, a switching transistor to turn on and off a current flowing in the primary winding, a controlling transistor to control a feedback signal from the at least one control winding to said switching transistor, and a time constant circuit charged by a voltage generated across the at least one control winding and providing a controlling voltage to said controlling transistor, and further comprising a bias voltage generating circuit charged by a voltage generated across the at least one control winding and providing a DC bias to a controlling voltage to said controlling transistor, the bias voltage generating circuit disposed between a controlling voltage input portion to said controlling transistor and the at least one control winding.

17. The self-oscillation type switching power supply of claim 16, wherein the bias voltage generating circuit comprises a resistor and diode.

18. The self-oscillation type switching power supply of claim 16, further comprising a second control winding of said transformer, the voltage generated by the at least one control winding converted to the DC bias being generated by said second control winding.

19. A self-oscillation type switching power supply comprising a transformer having a primary winding, a secondary winding, and at least one control winding, a switching transistor to turn on and off a current flowing in the primary winding, a controlling transistor to control a feedback signal from the at least one control winding to said switching transistor, and a time constant circuit charged by a voltage generated across the at least one control winding and providing a controlling voltage to said controlling transistor, and further comprising a delay transistor to delay the turn-on of said switching transistor provided in a controlling signal input portion to said switching transistor and an impedance circuit to prevent a backward bias to said delay transistor from the at least one control winding provided between a controlling voltage input portion to said delay transistor and the at least one control winding.

20. The self-oscillation type switching power supply of claim 19, wherein the impedance circuit comprises a resistor and diode.

21. The self-oscillation type switching power supply of claim 19, wherein the delay transistor is coupled in parallel said controlling transistor.

22. The self-oscillation type switching power supply of claim 19, further comprising a second control winding of said transformer, the backward bias being generated by said second control winding.

23. The self-oscillation type switching power supply of claim 19, wherein the at least one control winding comprises a single control winding generating the feedback signal and the backward bias.

24. A self-oscillation type switching power supply comprising a transformer having a primary winding, a secondary winding, and at least one control winding, a switching transistor to turn on and off a current flowing in the primary winding, a controlling transistor to control a feedback signal from the at least one control winding to said switching transistor, and a time constant circuit charged by a voltage generated across the at least one control winding and providing a controlling voltage to said controlling transistor, and further comprising an impedance circuit to prevent a backward bias to said controlling transistor from the at least one control winding disposed between a controlling voltage input portion to said controlling transistor and the at least one control winding.

25. The self-oscillation type switching power supply comprising of claim 24, wherein the impedance circuit comprises a resistor and diode.

26. The self-oscillation type switching power supply of claim 24, further comprising a second control winding of said transformer, the backward bias being generated by said second control winding.

* * * * *